US009295242B2

(12) United States Patent
Hiraoka

(10) Patent No.: US 9,295,242 B2
(45) Date of Patent: Mar. 29, 2016

(54) SPINNING REEL

(71) Applicant: Shimano Inc., Sakai, Osaka (JP)

(72) Inventor: Hirokazu Hiraoka, Osaka (JP)

(73) Assignee: Shimano Inc., Osaka (JP)

( * ) Notice: Subject to any disclaimer, the term of this patent is extended or adjusted under 35 U.S.C. 154(b) by 240 days.

(21) Appl. No.: 14/044,098

(22) Filed: Oct. 2, 2013

(65) Prior Publication Data

US 2014/0175205 A1    Jun. 26, 2014

(30) Foreign Application Priority Data

Dec. 20, 2012  (JP) ................................. 2012-278710

(51) Int. Cl.
*A01K 89/01* (2006.01)

(52) U.S. Cl.
CPC .................................. *A01K 89/0108* (2013.01)

(58) Field of Classification Search
CPC ............ A01K 89/01; A01K 89/01081; A01K 89/01085; A01K 89/01121; A01K 89/011221
See application file for complete search history.

(56) References Cited

U.S. PATENT DOCUMENTS

| 4,337,905 | A | * | 7/1982 | Sazaki | 242/232 |
| 5,261,628 | A | * | 11/1993 | Carlsson | 242/233 |
| 5,820,051 | A | * | 10/1998 | Takeuchi et al. | 242/232 |
| 5,820,052 | A | * | 10/1998 | Yamaguchi et al. | 242/232 |
| 5,820,053 | A | * | 10/1998 | Takeuchi et al. | 242/247 |
| 6,082,649 | A | * | 7/2000 | Smith et al. | 242/233 |
| 2003/0173437 | A1 | * | 9/2003 | Iwabuchi et al. | 242/231 |
| 2003/0197081 | A1 | * | 10/2003 | Chin | 242/242 |
| 2005/0145735 | A1 | * | 7/2005 | Ikuta | 242/307 |
| 2006/0266861 | A1 | * | 11/2006 | Kitajima et al. | 242/322 |
| 2008/0191079 | A1 | * | 8/2008 | Sugahara et al. | 242/230 |
| 2011/0174909 | A1 | * | 7/2011 | Shibata et al. | 242/230 |

FOREIGN PATENT DOCUMENTS

| EP | 1 260 138 A1 | * 11/2002 |
| JP | 2004-141039 A | 5/2004 |
| JP | 2005-95131 A | 4/2005 |
| JP | 2007-195436 A | 8/2007 |
| JP | 2003-274816 A | 9/2008 |

OTHER PUBLICATIONS

European Search Report of corresponding EP Application No. 13 19 2768.3 dated Mar. 19, 2014.

* cited by examiner

*Primary Examiner* — Emmanuel M Marcelo
(74) *Attorney, Agent, or Firm* — Global IP Counselors

(57) ABSTRACT

A spinning reel for delivering fishing line has a spinning reel body, a handle, a rotor, and a spool. A rotor body of the rotor has a cylindrical coupling portion, a first rotor arm, and a second rotor arm. A first cover member of the rotor is removably attached to the rotor body covering a radially outer side of the first rotor arm. A first guard member of the rotor is removably attached to the rotor body and has a first guard portion covering a boundary between an outside surface of the coupling portion and a rear end surface of the coupling portion. A second guard member of the rotor is removably attached to the rotor body and has a second guard portion that covers the boundary between the outside surface and the rear end surface at a position opposing the first guard portion.

15 Claims, 6 Drawing Sheets

SPINNING REEL

CROSS-REFERENCE TO RELATED APPLICATIONS

This application claims priority to Japanese Patent Application No. 2012-278710, filed on Dec. 20, 2012. The entire disclosure of Japanese Patent Application No. 2012-278710 is hereby incorporated herein by reference.

BACKGROUND

1. Field of the Invention

The present invention relates to a spinning reel, in particular, to a rotor of a spinning reel that delivers fishing line in the forward direction.

2. Background Information

A rotor pivotally coupled to a fishing line guide portion for winding fishing line on a spool is provided to a spinning reel. The rotor includes a coupling portion rotatably supported by the reel body via a pinion gear and first and second rotor arms provided to the coupling portion. The outside surface of the first rotor arm is covered with a cover member. A cylindrically shaped open portion is formed at the rear end portion of the coupling portion. There is a concern that the outside surface of the cover member provided to the open portion, the first rotor arm, and the second rotor arm may be scratched when the spinning reel is placed on the ground with the fishing pole attached. There is a well-known spinning reel that has a guard member for guarding the first and second rotor arms and the rear end portion of the coupling portion (refer to Japanese Laid Open Patent Publication No. 2005-095131 and Japanese Laid Open Patent Publication No. 2004-141039). The cover member in Japanese Laid Open Patent Publication No. 2005-095131 is made from metal and is disposed so as to protrude to the surface from between the open portion and the cover member provided to the rotor arms or the rear cover member that covers the open portion. The guard member in Japanese Laid Open Patent Publication No. 2004-141039 is an integrally formed member made from metal which guards and reinforces the first and second rotor arms. The guard member is disposed between the rear end portion of the coupling portion and the cover member as well as between the first and second rotor arms.

SUMMARY

In the conventional spinning reel, when the guard member is scratched and the guard member needs to be replaced, removing the rear cover member that covers the opening and detaching the rotor from the reel body is necessary. Therefore, replacing the guard member is difficult.

The object of the present invention is to protect the boundary between the rear end surface and the outside surface of the coupling portion while allowing for easy replacement of the guard member.

The spinning reel according to the first aspect of the present invention is a reel for delivering fishing line in a forward direction. The spinning reel includes a spinning reel body, a handle, a rotor, and a spool. The handle is rotatably supported by the reel body. The rotor is supported by the reel body to rotate around a longitudinal axis that is offset from an axis of rotation of the handle. The spool is supported by the reel body to move in a longitudinal direction of the longitudinal axis, and the spool is arranged to have the fishing line wound thereon by the rotor.

The rotor includes a rotor body, a first cover member, a first guard member, a second guard member, and a fishing line guide portion. The rotor body has a cylindrical coupling portion, a first rotor arm, and a second rotor arm. The cylindrical coupling portion is rotatably supported by the reel body. The first rotor arm extends forward from a rear end portion of the coupling portion. The first rotor arm is spaced apart from the coupling portion. The first rotor arm has a pair of first side portions. The second rotor arm extends forward from the rear end portion of the coupling portion. The second rotor arm is spaced apart from the coupling portion. The second rotor arm has a pair of second side portions. The first and second rotor arms are located on diametrically opposite sides of the coupling portion.

The first cover member is removably attached to the rotor body and covers a radially outer side of the first rotor arm. The first guard member is removably attached to the rotor body. The first guard member has a first guard portion that covers at least a portion of a boundary between an outside surface of the coupling portion and the rear end surface of the coupling portion. The second guard member is removably attached to the rotor body. The second guard member has a second guard portion that covers at least a portion of the boundary between the outside surface and the rear end surface of the coupling portion at a position that opposes the first guard portion. The fishing line guide portion is pivotally coupled to the extreme ends of the first rotor arm and the second rotor arm. The fishing line guide portion is arranged to wind the fishing line onto the spool.

In this spinning reel, the first guard portion of the first guard member covers at least a portion of the boundary between the outside surface and the rear end surface of the coupling portion. Also, the second guard portion of the second guard member covers at least a portion of the boundary between the outside surface and the rear end surface of the coupling portion at a position that opposes the first guard portion. Here, at least a portion of the boundary between the outside surface and the rear end surface of the coupling portion is protected by the two guard members, namely, the first guard member and the second guard member at the respectively different positions. Therefore, the first guard member and the second guard member can be detached separately without detaching the rotor from the reel body. As a result, the rear end surface and the outside surface of the coupling portion can be protected while allowing for easy replacement.

The spinning reel according to the second aspect of the present invention relates to the spinning reel according to the first aspect of the present invention, wherein the first guard portion and the second guard portion are disposed in the coupling portion between the first rotor arm and the second rotor arm. In this case, due to the first guard portion and the second guard portion being disposed in the coupling portion between the first rotor arm and the second rotor arm, the rear end portion of the coupling portion that may come into contact with the ground can reliably be protected. Also, integrally forming the section for protecting the first rotor arm and the second rotor arm is easy when protecting in combination both the first rotor arm and the second rotor arm.

The spinning reel according to the third aspect of the present invention relates to the spinning reel according to the second aspect of the present invention, wherein a third guard portion that covers at least a portion of a boundary between the first cover member and one of the first side portions of the first rotor arm. The second has, in addition, a fourth guard portion that covers at least a portion of a boundary between the first cover member and the other first side portion of the first rotor arm. In this case, in addition to protecting the rear end surface and the outside surface of the coupling portion, the boundary between the pair of side portions of the first rotor arm and the first cover member can also be protected.

The spinning reel according to the fourth aspect of the present invention relates to the spinning reel according to the third aspect of the present invention, wherein the first cover member is fixed at least to the first rotor arm by a first screw member. The first guard member is fixed to the rotor body by a second screw member at a connecting section that is located between the first guard portion and the third guard portion, and the second guard member is fixed to the rotor body by a third screw member at a connecting section that is located between the second guard portion and the fourth guard portion.

In this case, the first cover member is fixed to the first rotor arm by the first screw member, and the first guard member and the second guard member are fixed to the rotor body by second and third screw members, respectively. Therefore, the first guard member and the second guard member can be detached from the rotor body via the respective second or third screw member.

The spinning reel according to the fifth aspect of the present invention relates to the spinning reel according to the third or the fourth aspect of the present invention, wherein the third guard portion has a first holding portion disposed between the first cover member, and the first holding portion is fixed to the first rotor arm by the first cover member. The fourth guard portion has a second holding portion disposed between the first cover member, and the second holding portion is fixed to the first rotor arm by the first cover member.

In this case, when the first cover member is fixed to the first rotor arm, the first holding portion and the second holding portion are fixed to the first rotor arm. Therefore, even if the first guard member and the second guard member are respectively fixed with a single screw member, wobbling is not likely to occur in the third guard portion and the fourth guard portion.

The spinning reel according to the sixth aspect of the present invention relates to the spinning reel according to the fifth aspect of the present invention, wherein the first holding portion has a first engaging portion engaging the inner surface of the first cover member and preventing displacement of the third guard portion. The first holding portion further has a first positioning protrusion that is provided separate from the first engaging portion to position the third guard portion. The second holding portion has a second engaging portion engaging the inner surface of the first cover member and preventing displacement of the fourth guard portion. The second holding portion further has a second positioning protrusion that is provided separate from the second engaging portion to position the fourth guard portion.

In this case, even if the first guard member and the second guard member are respectively fixed to the rotor body with a single screw member, displacement of the third guard portion of the first guard member can be prevented with the first engaging portion, and displacement of the fourth guard portion of the second guard member can be prevented with the second engaging portion. Also, the third guard portion is positioned by the first positioning protrusion, and the fourth guard portion is positioned by the second positioning protrusion. Therefore, the third guard portion and the fourth guard portion are not likely to be displaced.

The spinning reel according to the seventh aspect of the present invention relates to the spinning reel according to any one of the second to the sixth aspects of the present invention, wherein the first guard portion and the third guard portion of the first guard member have exterior surfaces that are smoothly connected to each other, and the second guard portion and the fourth guard portion of the second guard member have exterior surfaces that are smoothly connected to each other.

In this case, the third guard portion that is disposed along the longitudinal direction, and the first guard portion that is disposed along the circumferential direction, as well as the fourth guard portion that is disposed along the longitudinal direction and the second guard portion that is disposed along the circumferential direction, are smoothly connected. Therefore, the fishing line is not likely to get caught at the connecting section(s).

The spinning reel according to the eighth aspect of the present invention relates to the spinning reel according to any one of the second to the seventh aspects of the present invention, wherein the rotor has, in addition, a second cover member that covers a radially outer side of the second rotor arm. One of the first side portions of the first rotor arm is disposed upstream of the other of the first side portions with respect to a fishing line winding direction of the rotor. The first guard member covers at least a portion of a boundary between one of the second side portions of the second rotor arm and the second cover member. The first guard member has a fifth guard portion integrally formed with the first guard portion as a one-piece member. The second guard member covers at least a portion of a boundary between the other of the second side portions of the second rotor arm and the second cover member. The second guard member has a sixth guard portion integrally formed with the second guard portion as a one-piece member. One of the second side portions of the second rotor arm is disposed downstream of the other of the second side portions with respect to the fishing line winding direction of the rotor.

In this case, the boundary between one of the second side portions of the second rotor arm and the second cover member is covered with the first guard member, and the boundary between the other second side portion of the second rotor arm and the second cover member is covered with the second guard member. Therefore, it is possible to protect the boundary between the pair of second side portions of the second rotor arm and the second cover member in addition to protecting the boundary between the rear end surface and the outside surface of the coupling portion and the boundary between the pair of first side portions of the first rotor arm and the first cover member.

The spinning reel according to the ninth aspect of the present invention relates to the spinning reel according to the eighth aspect of the present invention, wherein the second cover member is fixed at least to the second rotor arm by a fourth screw member. The first guard member is fixed to the rotor body by a fifth screw member at a connecting section that is located between the first guard portion and the fifth guard portion, and the second guard member is fixed to the rotor body by a sixth screw member at a connecting section that is located between the second guard portion and the sixth guard portion.

In this case, the second cover member is fixed to the rotor with the fourth screw member, and the first guard member and the second guard member are fixed to the rotor body with the fifth screw member and the sixth screw member, respectively. Therefore, the first guard member and the second guard member can be detached from the rotor body by the respective screw members.

The spinning reel according to the tenth aspect of the present invention relates to the spinning reel according to the ninth aspect of the present invention, wherein the fifth guard portion has a third holding portion disposed between the second cover member, and the third holding portion is fixed to the second rotor arm by the second cover member. The sixth guard portion has a fourth holding portion disposed between the second cover member, and the fourth holding portion is fixed to the second rotor arm by the second cover member.

In this case, when the second cover member is fixed to the second rotor arm, the third holding portion and the fourth holding portion are fixed to the second rotor arm. Therefore, even if the first guard member and the second guard member are fixed with screw members at the respective connecting sections, wobbling is not likely to occur in the fifth guard portion and the sixth guard portion.

The spinning reel according to the eleventh aspect of the present invention relates to the spinning reel according to the tenth aspect of the present invention, wherein the third holding portion has a third engaging portion engaging the inner surface of the second cover member and preventing displacement of the fifth guard portion. The third holding portion further has a third positioning protrusion that is provided separate from the third engaging portion position the fifth guard portion. The fourth holding portion has a fourth engaging portion engaging the inner surface of the second cover member and preventing displacement of the sixth guard portion. The fourth holding portion further has a fourth positioning protrusion that is provided separate from the fourth engaging portion to position the sixth guard portion.

In this case, even if the first guard member and the second guard member are fixed to the rotor body by screw members at the respective connecting sections, the respective displacement of the fifth guard portion of the first guard member and the sixth guard portion of the second guard member can be prevented with the third engaging portion and the fourth engaging portion; moreover, the positioning thereof is carried out by the third positioning protrusion and the fourth positioning protrusion. Therefore, even if a fifth guard portion is provided to the first guard member and a sixth guard portion to the second guard member, displacement of the fifth guard portion and the sixth guard portion is not likely to occur.

The spinning reel according to the twelfth aspect of the present invention relates to the spinning reel according to any one of the eighth to the eleventh aspects of the present invention, wherein the first guard portion and the fifth guard portion of the first guard member have exterior surfaces that are smoothly connected to each other, and the second guard portion and the sixth guard portion of the second guard member have exterior surfaces that are smoothly connected to each other.

In this case, the fifth guard portion disposed along the longitudinal direction and the first guard portion disposed along the circumferential direction, as well as the sixth guard portion disposed along the longitudinal direction and the second guard portion disposed along the circumferential direction, are connected smoothly. Therefore, the fishing line is not likely to get caught at the connecting section(s).

The spinning reel according to the thirteenth aspect of the present invention relates to the spinning reel according to any one of the second to the twelfth aspects of the present invention, wherein the first guard member and the second guard member are made from a synthetic resin material, and the synthetic resin material is exposed to the outside surface. In this case, the first guard member and the second guard member are made from a synthetic resin. Therefore, reduction in the weight can be achieved even if a guard member that is softer and more easily scratched than that made from metal is installed. Also, the synthetic resin material is exposed on the outside surface, namely, a coat is not formed according to plating, coating, or the like. Therefore, the coat does not peel off, and only the material itself is scratched. As a result, even if the first guard member and the second guard member are scratched, the scratch will not be conspicuous.

According to the present invention, at least one portion of the boundary between the pair of first side portions of the first rotor arm and the first guard member can be covered with two guard members, namely, the first guard member and the second guard member. Therefore, the boundary between the first rotor arm and the first cover member can be protected. Moreover, the boundary between the pair of first side portions of the first rotor arm and the first guard member and the boundary between the rear end surface and the outside surface of the coupling portion are respectively protected by the two guard members, namely, the first guard member and the second guard member. Therefore, the first guard member and the second guard member can be detached separately without removing the rotor. As a result, the boundary between the rotor arm and the cover member, as well as between the rear end surface and the outside surface of the coupling portion, can be protected while allowing for easy replacement.

Other objects, features, aspects and advantages of the disclosed spinning reel will become apparent to those skilled in the art from the following detailed description, which, taken in conjunction with the annexed drawings, discloses preferred embodiments of the spinning reel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Overall Configuration and Configuration of the Reel Body

Figure 1:
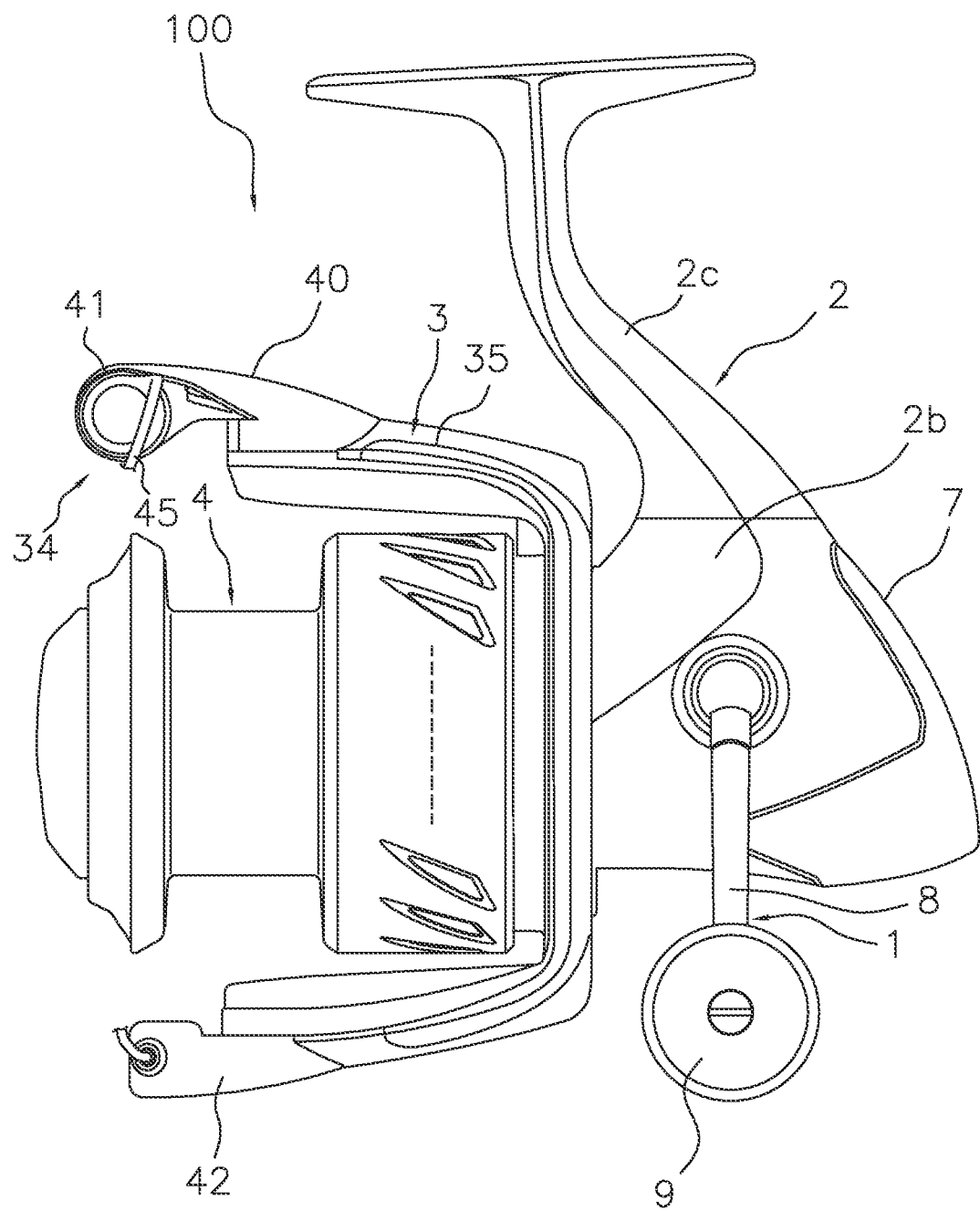
FIG. 1 is a side elevational view of a spinning reel according to an embodiment of the present invention.
Figure 2:
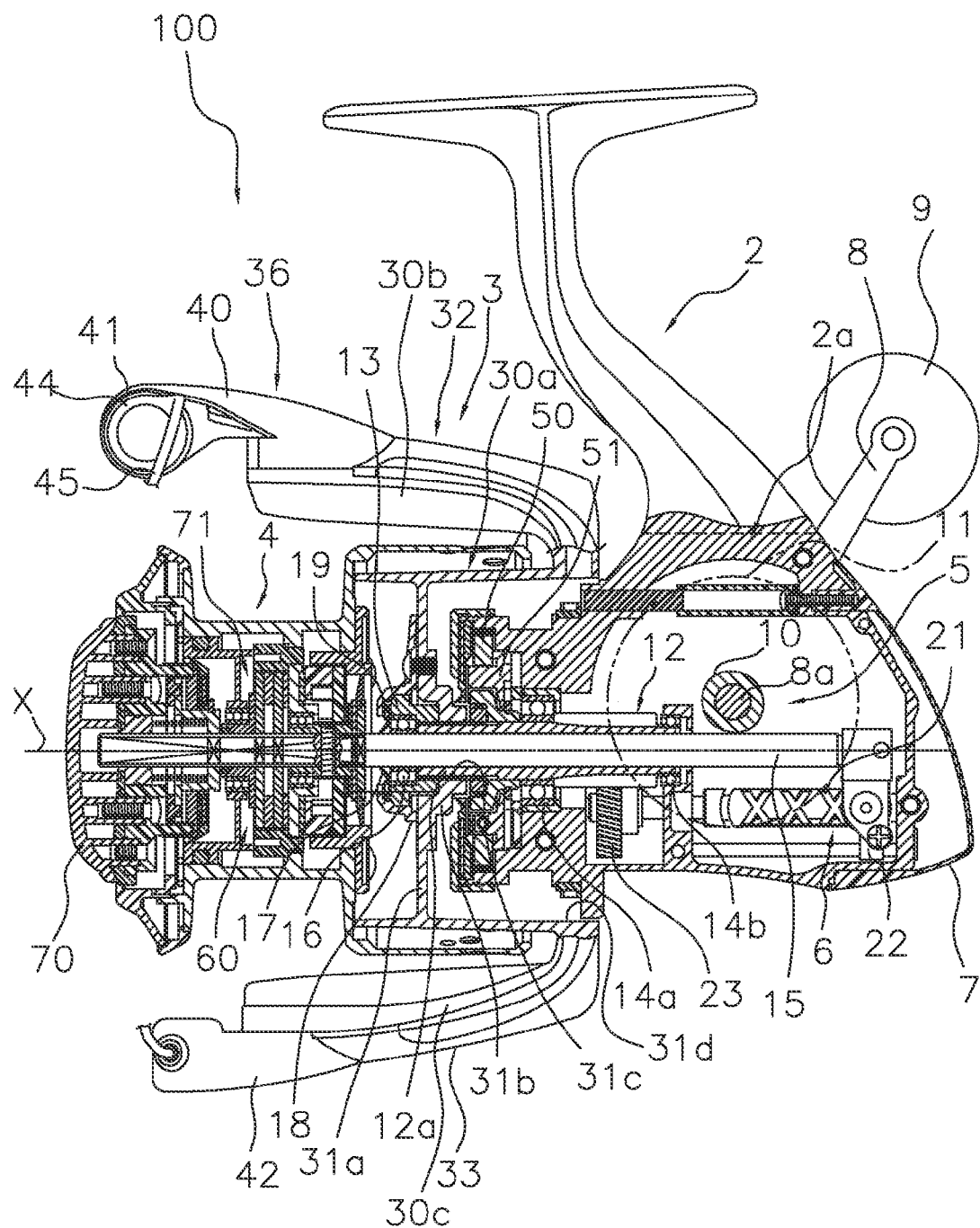
FIG. 2 is a cross-sectional side view of the spinning reel.

In FIGS. 1 and 2, the spinning reel 100 according to an embodiment of the present invention delivers fishing line in the forward direction. The spinning reel 100 includes a reel body 2 that rotatably supports the handle 1, a rotor 3, and a spool 4. The rotor 3 is for winding fishing line on the spool 4 and is rotatably supported at the front portion of the reel body 2. The spool 4 is for winding fishing line on its outer circumferential surface and is disposed at the front portion of the rotor 3 to move back and forth. The handle 1 can be mounted on either the left side of the reel body 2 or on the right side of the reel body 2 as illustrated in FIG. 1.

As illustrated in FIGS. 1 and 2, the handle 1 has a handle arm 8 that is mounted at the tip of a handle shaft 8a (FIG. 2). The handle arm 8 extends in a direction intersecting a direction in which the handle shaft 8a extends. The handle 1 also has a handle shaft (not illustrated in the drawings) fixed to the extreme end of the handle arm 8, and a handle grip 9 rotatably mounted to that handle shaft.

Configuration of the Reel Body

As illustrated in FIGS. 1 and 2, the reel main body 2 has a reel body 2a that has an opening and is made from, for example, an aluminum alloy, a cover member 2b (refer to FIG. 1) that is detachably mounted to the reel body 2a to cover the opening and that is made from, for example, an aluminum alloy, and a rod attachment leg 2c that extends forward at an upward slant from the reel body 2a. The reel body 2a has a space on the inside communicating with the opening, and this space accommodates a rotor drive mechanism 5 for rotating the rotor 3 by interlocking with the rotation of the handle 1 and an oscillating mechanism 6 for uniformly winding fishing line by moving the spool 4 back and forth. A guard 7 is mounted to the rear portion of the cover member 2b and the reel body 2a. The guard 7 is fixed to the reel body 2a according to a single screw member.

Configuration of the Rotor Drive Mechanism

As illustrated in FIG. 2, the rotor drive mechanism 5 includes a drive shaft 10 whereto the handle shaft 8a of the handle 1 is fixed, a drive gear 11 that rotates in conjunction with the drive shaft 10, and a pinion gear 12 that interlocks with the drive gear 11. The drive shaft 10 is, for example, a cylindrical shaft made from a stainless steel alloy and is supported at the two ends with bearings (not illustrated in the drawing) mounted to the reel body 2a and the cover member 2b. A female threaded portion (not illustrated in the drawing) is formed on the inner circumferential surface of the drive shaft 10.

The pinion gear 12 is, for example, a cylindrical member made from a stainless steel alloy, and the front portion 12a thereof penetrates the center portion of the rotor 3 and is integrally and rotatably fixed to the rotor 3 with a nut 13. The nut 13 is prevented from rotating with a retainer 18. The retainer 18 is fixed to the rotor 3. The middle portion and the rear end portion in the axial direction of the pinion gear 12 are rotatably supported by the reel body 2a with bearings 14a and 14b that are mounted to the reel body 2a and spaced apart from each other.

Configuration of the Oscillating Mechanism

The oscillating mechanism 6 is a mechanism for moving a spool shaft 15 coupled to the center portion of the spool 4 via a drag mechanism 60 in the longitudinal direction to reciprocally move the spool 4 in the longitudinal direction. The spool shaft 15 partially defines a longitudinal axis X. The oscillating mechanism 6 has a screw shaft 21 disposed below the spool shaft 15 to be parallel to the spool shaft 15, a slider 22 that moves in the longitudinal direction along the screw shaft 21, and an intermediate gear 23 fixed to the tip of the screw shaft 21. The screw shaft 21 is disposed in the longitudinal direction and rotatably supported by the reel body 2a. The base end of the spool shaft 15 is rotatably coupled to the slider 22.

The rear end of the spool shaft 15 is non-rotatably fixed to the slider 22. The slider 22 is guided in the longitudinal direction according to two guide shafts (not illustrated in the drawing) provided to the reel body 2a along the longitudinal direction. The intermediate gear 23 interlocks with the pinion gear 12.

The spool shaft 15 is disposed so as to penetrate the center portion of the pinion gear 12. The spool shaft 15 reciprocally moves back and forth on the inside portion of the pinion gear 12 according to the oscillating mechanism 6. The middle portion of the spool shaft 15 is supported by a bearing 16 mounted in the nut 13, and the rear portion of the spool shaft 15 is supported by the rear inner circumferential surface of the pinion gear 12 to rotate and move in the axial direction.

Configuration of the Rotor

Figure 3:
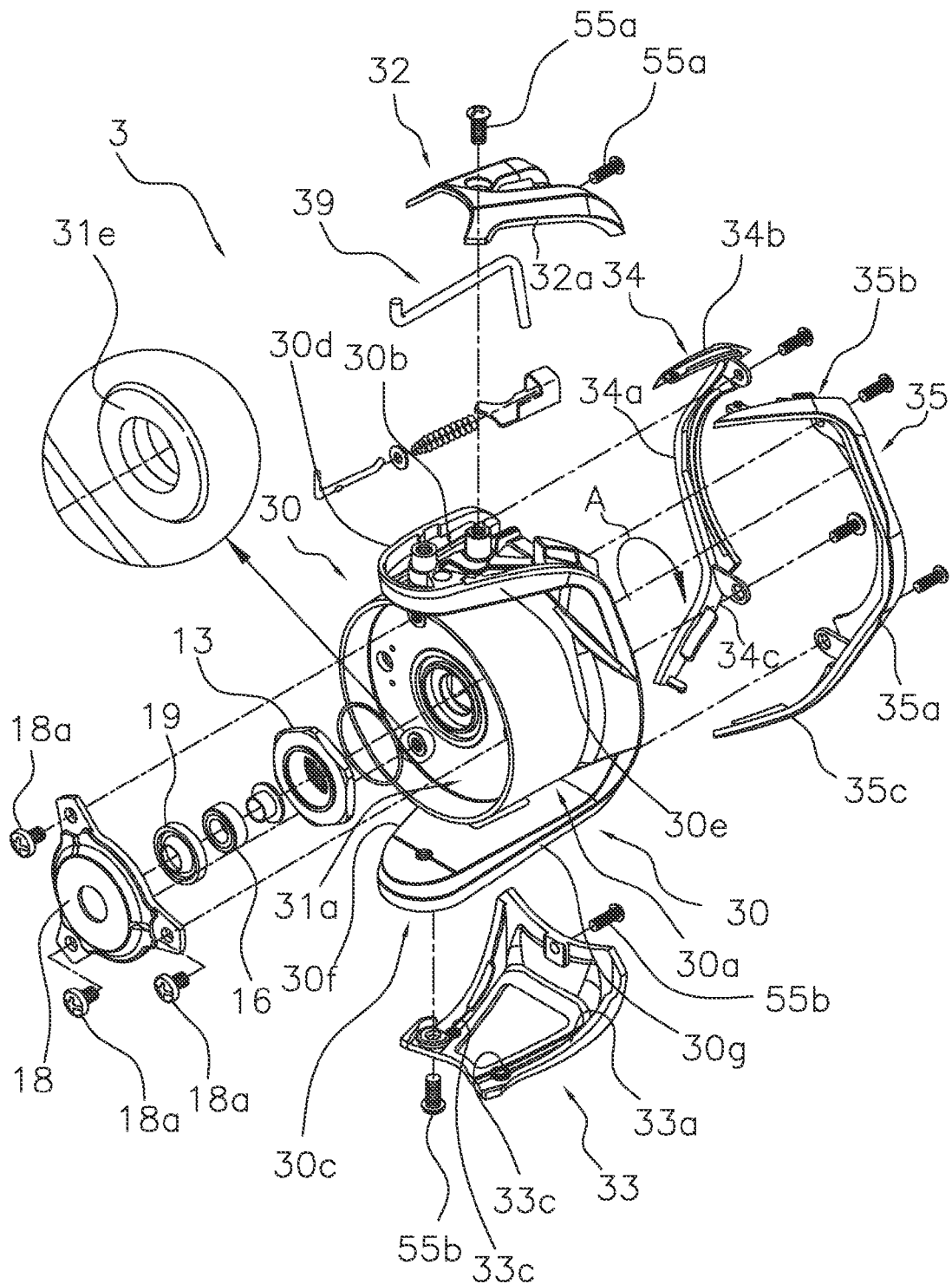
FIG. 3 is an exploded perspective view of a rotor of the spinning reel.

As illustrated in FIGS. 2 and 3, the rotor 3 is rotatably supported by the reel main body 2 via the pinion gear 12. The rotor 3 includes a rotor body 30 integrally and rotatably coupled to the pinion gear 12, a first cover member 32, a second cover member 33, a first guard member 34 (refer to FIG. 3), a second guard member 35, and a bail arm 36 (an example of a fishing line guide portion).

The rotor body 30 has a bottom cylindrical coupling portion 30a rotatably coupled to the reel body 2 via the pinion gear 12, a first rotor arm 30b, and a second rotor arm 30c. The coupling portion 30a is cylindrically formed to slightly increase in diameter toward the rear. The first rotor arm 30b extends forward from the first side (the top side in FIG. 2) of the rear end portion of the coupling portion 30a while being spaced apart from the coupling portion 30a. The second rotor arm 30c extends forward from the second side (the bottom side in FIG. 2) that opposes the first side of the rear end portion of the coupling portion 30a while being spaced apart from the coupling portion 30a. The rotor body 30 is integrally formed, for example, from an aluminum alloy or a magnesium alloy.

A wall portion 31a is formed at the front portion of the coupling portion 30a, and a boss portion 31b is formed at the center portion of the wall portion 31a. A through hole 31c is formed at the center portion of the boss portion 31b, and the front portion 12a of the pinion gear 12 and the spool shaft 15 penetrate this through hole 31c. A nut 13 for fixing the rotor 3 to the pinion gear 12 is disposed at the front portion of the wall portion 31a. A seal member 17 for preventing liquid from infiltrating into the reel 2a from the space between the spool shaft 15 and the nut 13 is mounted between the nut 13 and the spool shaft 15. The seal member 17 is disposed so as to make contact with the nut 13. A concave portion 31d that has a circular space capable of accommodating the front portion of the reel body 2 is formed at the rear portion of the coupling portion 30a.

A retainer 18 is mounted to the front surface of the wall portion 31a of the coupling portion 30a. The retainer 18 is fixed to the wall portion 31a with multiple (e.g., three) bolt members 18a. The retainer 18 is provided to prevent the nut 13 from rotating, as well as to slightly pressurize the seal member 17 to prevent a space from being created between the bearing 16 and the spool shaft 15. A mounting seat 31e, which has a female threaded portion that protrudes forward slightly more (e.g., 0.5 mm to 2 mm) than the other portions, is provided to the wall portion 31a as illustrated enlarged in FIG. 3. Machining of the end surface of the mounting seat 31e that protrudes more than the other portions as described above is possible. Therefore, the mounting position of the retainer 18 is not easily tilted, and the seal member 17 can be stably pressurized. As a result, the sealing performance of the seal member 17 is enhanced.

As illustrated in FIG. 3, the first rotor arm 30b extends forward while outwardly curving in a convex shape from the coupling portion 30a and curves while narrowing in the circumferential direction of the coupling portion 30a. The first rotor arm 30b has a pair of first side portions 30d and 30e. The first side portion 30d is disposed more on the upstream side of the rotor 3 in a fishing line winding direction indicated with arrow A than the other first side portion 30e. The second rotor arm 30c extends forward while outwardly curving in a convex shape from the coupling portion 30a, and a connecting part to the coupling portion 30a curves while narrowing in the circumferential direction of the coupling portion 30a. The second rotor arm 30c has a pair of second side portions 30f and 30g. One of the second side portions 30f is disposed more on the downstream side of the rotor 3 in the fishing line winding direction indicated with arrow A than the other second side portion 30g.

The first cover member 32 covers the radially outer side of the first rotor arm 30b. The first cover member 32 has an outside surface configured from a three-dimensional curved surface. The first cover member 32 is fixed to the first rotor arm 30b by two screw members 55a that are mounted from the outside surface and the rear end portion. The screw member 55a is one example of a first screw member. A bail arm reversing mechanism 39 is disposed between the first cover member 32 and the first rotor arm 30b. The rear end portion of the first cover member 32 is formed into an arc-shape extending along the rear end outer circumferential surface of the coupling portion 30a. Accordingly, the rear end portion of the first rotor arm 30b is covered. A pair of first mounting concave portions 32a that are slightly concaved for mounting the third guard portion 34b, to be described later, of the first guard member 34 and the fourth guard portion 35b, to be described later, of the second guard member 35 are formed at the two side portions of the first cover member 32.

The second cover member 33 covers the radially outer side of the second rotor arm 30c. The second cover member 33 has an outside surface configured from a three-dimensional curved surface. The center portion of the second cover member 33 is opened. The second cover member 33 is fixed to the second rotor arm 30c by two screw members 55b that are mounted from the outside surface and the rear end portion. The screw member 55b is one example of a fourth screw member. The rear end portion of the second cover member 33 is formed into an arc-shape extending along the rear end outer circumferential surface of the coupling portion 30a. Accordingly, the rear end portion of the second rotor arm 30c is covered. A pair of second mounting concave portions 33a that are slightly concaved for mounting the fifth guard portion 34c, to be described later, of the first guard member 34 and the sixth guard portion 35c, to be described later, of the second guard member 35 are formed at the two side portions of the second cover member 33

Figure 4:
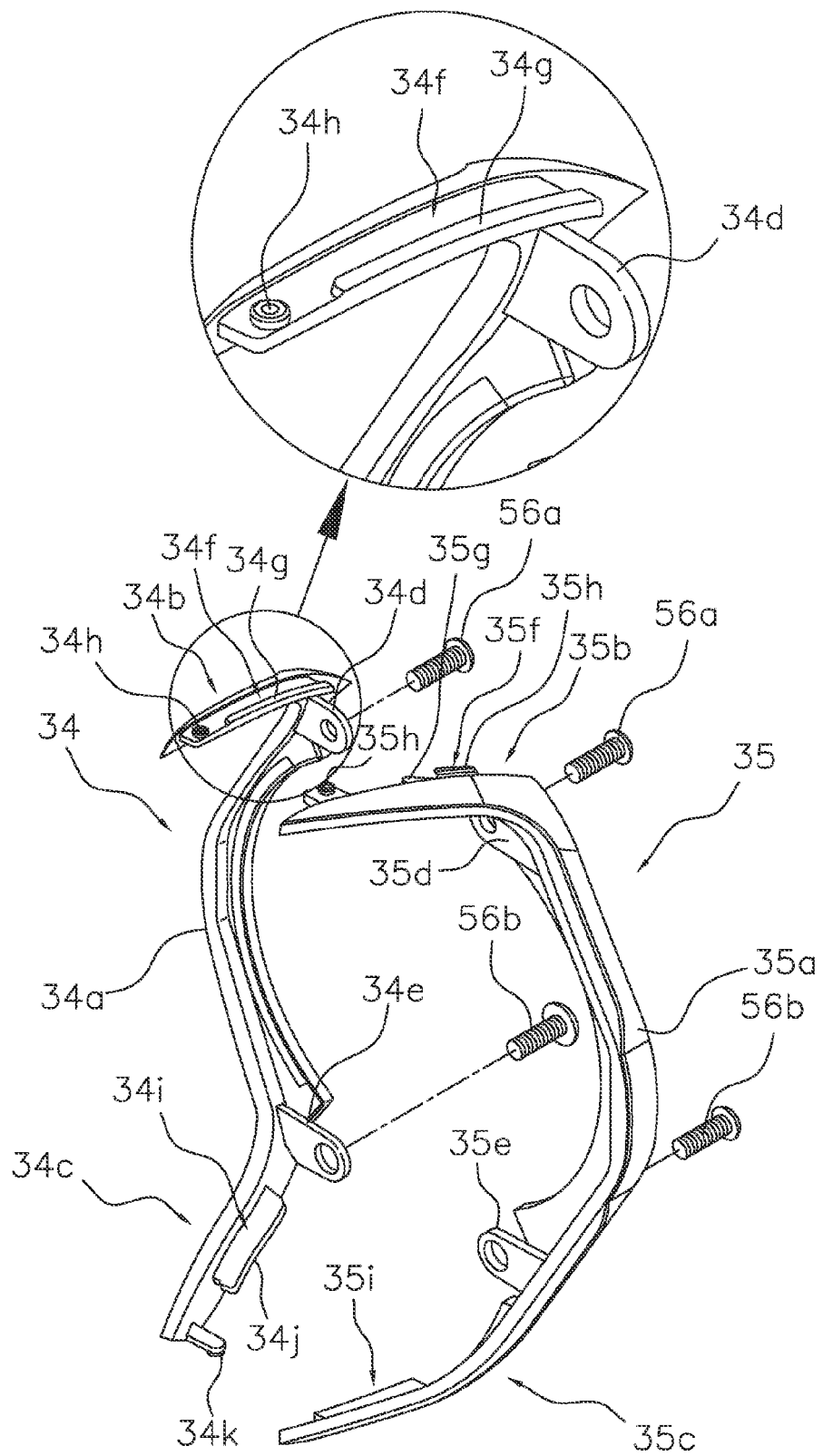
FIG. 4 is an exploded perspective view of a guard member of the rotor.

As illustrated in FIGS. 3 and 4, the first guard member 34 is detachably disposed to the rotor body 30. The first guard member 34 has a first guard portion 34a, a third guard portion 34b, and a fifth guard portion 34c. The second guard member 35 has a second guard portion 35a, a fourth guard portion 35b, and a sixth guard portion 35c. The first guard member 34 and the second guard member 35 are respectively made from, for example, a synthetic resin, such as polyamide resin, polyacetal resin, or the like, and are formed for the synthetic resin material to be exposed on the outside surface. Therefore, a coat according to plating, coating, or the like is not formed on the outside surface. As a result, in the first guard member 34 and the second guard member 35, the color of the synthetic resin material (e.g., black, yellow, red, grey, white, or the like) appears on the exterior.

The first guard portion 34a covers at least the boundary between the outside surface and the rear end surface of the round coupling portion 30a. In this embodiment, the first guard portion 34a is disposed between the first rotor arm 30b and the second rotor arm 30c. The first guard portion 34a is formed to curve in an arc-shape along the rear end surface of the coupling portion 30a. The third guard portion 34b is integrally formed with the first guard portion 34a and covers at least one portion (one portion in this embodiment) of the boundary between the first cover member 32 and the first side portion 30d of the first rotor arm 30b. The second guard portion 34b extends forward along the first side portion 30d of the first rotor arm 30b. The fifth guard portion 34c is integrally formed with the first guard portion 34a at a position on the opposite side from the third guard portion 34b. The fifth guard portion 34c covers at least one portion (one portion in this embodiment) of the boundary between the second cover member 33 and the first side portion 30f of the second rotor arm 30c. The fifth guard portion 34c extends forward along the first side portion 30f of the second rotor arm 30c.

The second guard portion 35a covers one portion of the boundary between the outside surface and the rear end surface of the round coupling portion 30a at a position on the opposite side from the first guard portion 34a. The second guard portion 35a is formed to curve in an arc-shape along the rear end surface of the coupling portion 30a. The fourth guard portion 35b is integrally formed with the second guard portion 35a and covers at least one portion (one portion in this embodiment) of the boundary between the first cover member 32 and the other first side portion 30e of the first rotor arm 30b. The fourth guard portion 35b extends forward along the other first side portion 30e of the first rotor arm 30b. The sixth guard portion 35c is integrally formed with the second guard portion 35a at a position on the opposite side from the fourth guard portion 35b. The sixth guard portion 35c covers at least one portion (one portion in this embodiment) of the boundary between the second cover member 33 and the other second side portion 30g of the second rotor arm 30c. The sixth guard portion 35c extends forward along the other second side portion 30g of the second rotor arm 30c.

The first fastening brackets 34d and 35d are respectively disposed in the boundary between the first guard portion 34a and the third guard portion 34b and the boundary between the second guard portion 35a and the fourth guard portion 35b while opposing each other. The first fastening brackets 34d and 35d are disposed to make contact with the boss portion not illustrated in the drawing formed on the rear surface of the coupling portion 30a. The first fastening bracket 34d and the first fastening bracket 35d are each fixed to the first boss portion by a screw member 56a that is screwed to the first boss portion by penetrating each of the first fastening brackets 34d and 35d. The screw members 56a are examples of second and third screw members.

The second fastening brackets 34e and 35e are respectively disposed in the boundary between the first guard portion 34a and the fifth guard portion 34c and the boundary between the second guard portion 35a and the sixth guard portion 35c while opposing each other. The second fastening brackets 34e and 35e are disposed to make contact with the second boss portion, not illustrated in the drawing, formed on the rear surface of the coupling portion 30a. The second fastening bracket 34e and the second fastening bracket 35e are each fixed to the second boss portion by a screw member 56b that is screwed to the second boss portion by penetrating each of the second fastening brackets 34e and 35e. The screw members 56b are examples of fifth and sixth screw members. Therefore, the first guard member 34 and the second guard member 35 are detachably fixed to the rotor body 30 by the screw members 56a and the screw members 56b respectively.

Figure 5:
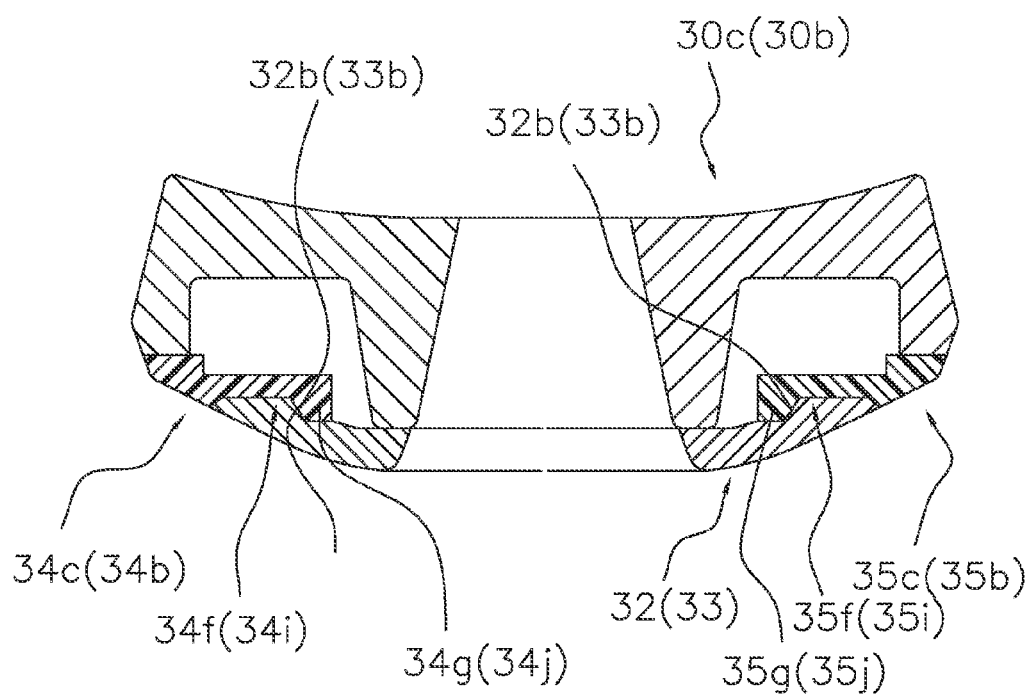
FIG. 5 is a schematic cross-sectional view of the extreme end side of a first rotor arm of the rotor.
Figure 6:
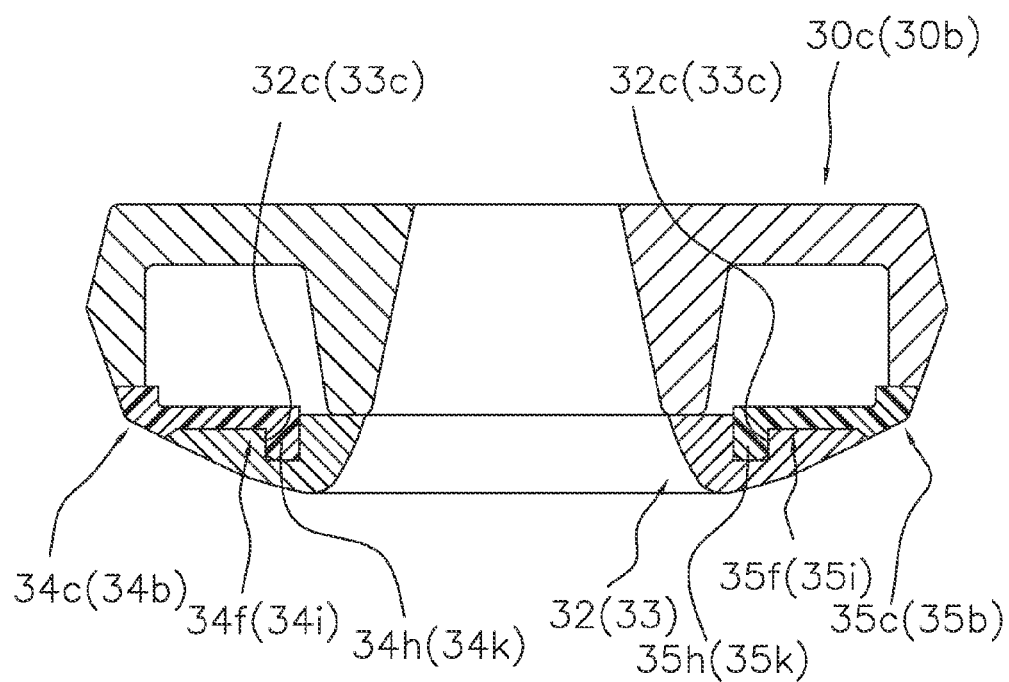
FIG. 6 is a schematic cross-sectional view of the base end side of the first rotor arm.

As illustrated in FIGS. 4, 5, and 6, the third guard portion 34b of the first guard member 34 has a first holding portion 34f. The first holding portion 34f is disposed between the first cover member 32 and the first rotor arm 30b and is fixed to the first rotor arm 30b by fixing the first cover member 32 to the first rotor arm 30b. The first holding portion 34f has a first engaging portion 34g for preventing displacement of the second guard portion 34b in relation to the first cover member 32 by engaging the inner surface of the first cover member 32. The first holding portion 34f also has a first positioning protrusion 34h provided separate from the first engaging portion 34g, with the first positioning protrusion 34h positioning the second guard portion 34b in relation to the first cover member 32. The first engaging portion 34g engages a tilted surface 32b (refer to FIG. 5) formed on the inner surface of the first cover member 32. The first positioning protrusion 34h is fitted to a positioning concave portion 32c (refer to FIG. 6) formed on the inner surface of the first cover member 32.

The fourth guard portion 35b of the second guard member 35 has a second holding portion 35f. The second holding portion 35f is disposed between the first cover member 32 and the first rotor arm 30b and is fixed to the first rotor arm 30b by fixing the first cover member 32 to the first rotor arm 30b. The second holding portion 35f has a second engaging portion 35g for preventing displacement of the fourth guard portion 35b in relation to the first cover member 32 by engaging the inner surface of the first cover member 32. The second holding portion 35f also has a second positioning protrusion 35h provided separate from the second engaging portion 35g, with the second positioning protrusion 35h positioning the fourth guard portion 35b in relation to the first cover member 32. The second engaging portion 35g engages the tilted surface 32b (refer to FIG. 5) formed on the inner surface of the first cover member 32. The second positioning protrusion 35h is fitted to the positioning concave portion 32c (refer to FIG. 6) formed on the inner surface of the first cover member 32.

Also, the fifth guard portion 34c of the first guard member 34 has a third holding portion 34i. The third holding portion 34i is disposed between the second cover member 33 and the second rotor arm 30c and is fixed to the second rotor arm 30c by fixing the second cover member 33 to the second rotor arm 30c. The third holding portion 34i has a third engaging portion 34j for preventing displacement of the fifth guard portion 34c in relation to the second cover member 33 by engaging the inner surface of the second cover member 33. The third holding portion 34i also has a third positioning protrusion 34k provided separate from the third engaging portion 34j, with the third positioning protrusion 34k positioning the fifth guard portion 34c in relation to the second cover member 33. The third engaging portion 34j engages a tilted surface 33b (refer to FIG. 5) formed on the inner surface of the second cover member 33. The third positioning protrusion 34k is fitted to a positioning concave portion 33c (refer to FIG. 6) formed on the inner surface of the second cover member 33.

The sixth guard portion 35c of the second guard member 35 has a fourth holding portion 35i. The fourth holding portion 35i is disposed between the second cover member 33 and the second rotor arm 30c and is fixed to the second rotor arm 30c by fixing the second cover member 33 to the second rotor arm 30c. The fourth holding portion 35i has a fourth engaging portion 35j for preventing displacement of the sixth guard portion 35c in relation to the second cover member 33 by engaging the inner surface of the second cover member 33. The fourth holding portion 35i also has a fourth positioning protrusion 35k provided separate from the fourth engaging portion 35j, with the fourth positioning protrusion 35k positioning the sixth guard portion 35c in relation to the second cover member 33. The fourth engaging portion 35j engages the tilted surface 33b (refer to FIG. 5) formed on the inner surface of the second cover member 33. The fourth positioning protrusion 35k is fitted to the positioning concave portion 33c (refer to FIG. 6) formed on the inner surface of the second cover member 33.

The third guard portion 34b, the first guard potion 34a, and the fifth guard portion 34c of the first guard member 34 are smoothly connected. The fourth guard portion 35b, the second guard potion 35a, and the sixth guard portion 35c of the second guard member 35 are smoothly connected.

Configuration of the Bail Arm

As illustrated in FIG. 2, the bail arm 36 is pivotally mounted to the extreme ends of the first and second rotor arms 30b and 30c to pivot between a fishing line unwinding position and a fishing line winding position. The bail arm 36 is energized between a fishing line unwinding position and a fishing line winding position by a bail arm reversing mechanism 39 (FIG. 3). The bail arm 36 winds fishing line onto the spool 4 via rotation of the rotor 3 in the fishing line winding direction when in the fishing line winding position.

The bail arm 36 includes a first bail support member 40 pivotally mounted to the outer circumferential side of, and at the tip of, the first rotor arm 30b, a second bail support member 42 pivotally mounted to the outer circumferential side of, and at the extreme end of, the second rotor arm 30c, and a line roller 41 rotatably mounted to the extreme end of the first bail support member 40. The bail arm 36 also includes a fastening shaft (not illustrated in the drawings) that is fixed to the extreme end of the first bail support member 40 while being cantilevered from the first bail support member 40 to support the line roller 41. The bail arm 36 also includes a fastening shaft cover 44 disposed on the extreme end side of the fastening shaft, and a bail 45 that couples the fastening shaft cover 44 to the second bail support member.

Configuration of the Other Components

As illustrated in FIG. 2, an anti-reverse mechanism 50 for preventing a reversal of the rotor 3 is disposed on the inside portion of the coupling portion 30a of the rotor 3. The anti-reverse mechanism 50 has a roller type one-way clutch 51 wherein the inner ring idles. This anti-reverse mechanism 50 generally prohibits rotation of the rotor 3 in a direction reverse from the fishing line delivery direction and does not at any time allow such reverse rotation.

As illustrated in FIG. 2, the spool 4 is disposed between the first rotor arm 30b and the second rotor arm 30c of the rotor 3 and is rotatably supported at the extreme end of the spool shaft 15. The spool 4 is wound with fishing line on its outer circumference and moves in the longitudinal direction in conjunction with the spool shaft 15. The spool 4 is made from, for example, an aluminum alloy. A drag mechanism 60 that applies a brake to the spool 4 such that a set drag force is applied to the spool 4 is accommodated on the inside portion of the spool 4.

As illustrated in FIG. 2, the drag mechanism 60 is a mechanism for applying a drag force to the spool 4 by braking the rotation of the spool 4 in the fishing line delivery direction. The drag mechanism 60 includes a drag knob assembly 70 for manually controlling the drag and a friction portion 71 that controls the drag force by being pressurized to the spool 4 side by the drag knob assembly 70. The drag knob assembly 70 is disposed at the front portion of the spool 4. The friction portion 71 is disposed on the inside portion of the spool 4.

Replacement Method of the First Guard Member and the Second Guard Member

When, for example, the first guard member 34 in a spinning reel 100 configured as described above is scratched, the two screw members 55a that are fastening the first cover member 32 are removed, and the first cover member 32 is detached from the first rotor arm 30b. Then, upon removing the two screw members 56a and 56b, which fasten the first guard member 34 to the rotor body 30, the first guard member 34 can be detached from the rotor body 30.

Also, the first guard member 34 and the second guard member 35 are made from a synthetic resin that does not have a coat, thereby allowing the color of the synthetic resin material to appear on the surface. Therefore, even if the members are scratched, the scratch will not be too conspicuous.

Features

The embodiment described above can be expressed as follows.

(A) The spinning reel 100 is a reel capable of delivering fishing line in the forward direction. The spinning reel 100 includes a reel body 2, a rotor 3, and a spool 4. A handle 1 is rotatably supported by the reel body 2. The rotor 3 is supported by the reel body 2 to rotate around the longitudinal axis X, the longitudinal axis X being offset from a location of the handle 1. The spool 4 is supported by the reel body 2 to move in the direction of the longitudinal axis and is wound with fishing line via the rotor 3.

The rotor 3 includes rotor body 30, a first cover member 32, a first guard member 34, a second guard member 35, and a bail arm 36. The rotor body 30 has a cylindrical coupling portion 30a, a first rotor arm 30b, and a second rotor arm 30c. The cylindrical coupling portion 30a is rotatably supported by the reel body 2. The first rotor arm 30b extends forward from the rear end portion of the coupling portion 30a and is spaced apart from the coupling portion 30a. The first rotor arm 30b has a pair of first side portions 30d and 30e. The second rotor arm 30c extends forward from a position that opposes the first rotor arm 30b at the rear end portion of the coupling portion 30a and is spaced apart from the coupling portion 30a. The second rotor arm 30c has a pair of second side portions 30f and 30g.

The first cover member 32 is detachably provided to the rotor body 30 and covers the radially outer side of the first rotor arm 30b. The first guard member 34 is detachably provided to the rotor body 30 and has a first guard portion 34a. The first guard portion 34a covers at least one portion of the boundary between the outside surface of the coupling portion 30a and the rear end surface of the coupling portion 30a. The second guard member 35 is detachably provided to the rotor body 30 and has a second guard portion 35a. The second guard portion 35a covers at least one portion of the boundary between the outside surface of the coupling portion 30a and the rear end surface of the coupling portion 30a at a position that opposes the first guard portion 34a. The bail arm 36 is pivotally provided to the extreme ends of the first rotor arm 30b and the second rotor arm 30c.

In this spinning reel 100, the first guard portion 34a of the first guard member 34 covers at least one portion of the boundary between the outside surface of the coupling portion 30a and the rear end surface of the coupling portion 30a. Also, the second guard portion 35a of the second guard member 35 covers at least one portion of the boundary between the outside surface of the coupling portion 30a and the rear end surface of the coupling portion 30a at a position that opposes the first guard portion 34a. Here, at least one portion of the boundary between the outside surface and the rear end surface of the coupling portion 30a is protected by the two guard members, namely, the first guard member 34 and the second guard member 35, at the respectively different positions. Therefore, the first guard member 34 and the second guard member 35 can be detached separately without detaching the rotor 3 from the reel body 2. As a result, the rear end surface and the outside surface of the coupling portion 30a can be protected while allowing for easy replacement.

(B) In the spinning reel 100, the first guard portion 34a and the second guard portion 35a are disposed at the coupling portion 30a between the first rotor arm 30b and the second rotor arm 30c. In this case, due to the first guard portion 34a and the second guard portion 35a being disposed at the coupling portion 30a between the first rotor arm 30b and the second rotor arm 30c, the rear end portion of the coupling portion 30a that may come into contact with the ground can be reliably protected. Also, integrally forming the section for protecting the first rotor arm 30b and the second rotor arm 30c is easy when protecting in combination both the first rotor arm 30b and the second rotor arm 30c.

(C) In the spinning reel 100, the first guard member 34 is integrally formed with the first guard portion 34a and has, in addition, a third guard portion 34b that covers at least one portion of the boundary between the first cover member 32 and the first side portion 30d of the first rotor arm 30b. The second guard member 35 is integrally formed with the second guard portion 35a and has, in addition, a fourth guard portion 35b that covers at least one portion of the boundary between the first cover member 32 and the other first side portion 30e of the first rotor arm 30b. In this case, in addition to protecting the rear end surface and the outside surface of the coupling portion 30a, the boundary between the pair of side portions 30d and 30e of the first rotor arm 30b and the first cover member 32 can be protected.

(D) In the spinning reel 100, the first cover member 32 is fixed at least to the first rotor arm 30b with the screw member 55a. The first guard member 34 is fixed to the rotor body 30 by the screw member 56a at a connecting section that is located between the first guard portion 34a and the third guard portion 34b. The second guard member 35 is also fixed to the rotor body by the screw member 56a at a connecting section that is located between the second guard portion 35a and the fourth guard portion 35b.

In this case, the first cover member 32 is fixed to the first rotor arm 30b with the screw member 55a. Also the first guard member 34 and the second guard member 35 are fixed to the rotor body 30 by the respective screw members 56a and 56b. Therefore, the first guard member 34 and the second guard member 35 can be detached from the rotor body 30 via the respective screw members 56a and 56b.

(E) In the spinning reel 100, the third guard portion 34b is disposed between the first cover member 32 and the first rotor arm 30b and has a first holding portion 34f fixed to the first rotor arm 30b by the first cover member 32. The fourth guard portion 35b is disposed between the first cover member 32 and the first rotor arm 30b and has a second holding portion 35f fixed to the first rotor arm 30b by the first cover member 32.

In this case, when the first cover member 32 is fixed to the first rotor arm 30b, the first holding portion 34f and the second holding portion 35f are fixed to the first rotor arm 30b. Therefore, even if the first guard member 34 and the second guard member 35 are respectively fixed with a single screw member 56a, wobbling is not likely to occur in the third guard portion 34b and the fourth guard portion 35b.

(F) In the spinning reel 100, the first holding portion 34f has a first engaging portion 34g that prevents displacement of the third guard portion 34b by engaging the inner surface of the first cover member 32. The first holding portion 34f also has a first positioning protrusion 34h that is provided separate from the first engaging portion 34g, with the first positioning protrusion 34h positioning the third guard portion 34b. The second holding portion 35f has a second engaging portion 35g that prevents displacement of the fourth guard portion 35b by engaging the inner surface of the first cover member 32. The second holding portion 35f also has a second positioning protrusion 35h that is provided separate from the second engaging portion 35g, the second positioning protrusion 35h positioning the fourth guard portion 35b.

In this case, even if the first guard member 34 and the second guard member 35 are respectively fixed to the rotor body 30 with a single screw member 56a, displacement of the third guard portion 34b of the first guard member 34 can be prevented with the first engaging portion 34g, and displacement of the fourth guard portion 35b of the second guard member 35 can be prevented with the second engaging portion 35g. Also, the third guard portion 34b is positioned by the first positioning protrusion 34h, and the fourth guard portion 35b is positioned by the second positioning protrusion 35h. Therefore, the third guard portion 34b and the fourth guard portion 35b are not likely to be displaced.

(G) In the spinning reel 100, the first guard portion 34a and the third guard portion 34b of the first guard member 34 and the second guard portion 35a and the fourth guard portion 35b of the second guard member 35 are connected smoothly.

In this case, the third guard portion 34b disposed along the longitudinal direction and the first guard portion 34a disposed along the circumferential direction, as well as the fourth guard portion 35b disposed along the longitudinal direction and the second guard portion 35a disposed along the circumferential direction, are connected smoothly. Therefore, the fishing line is not likely to get caught at the connecting section(s).

(H) In the spinning reel 100, the rotor 3 has, in addition, a second cover member 33 that covers the radial outer side of the second rotor arm 30c. The first side portion 30d of the first rotor arm 30b is disposed upstream of the other first side portion 30e with respect to the fishing line winding direction A of the rotor 3. The first guard member 34 covers at least one portion of the boundary between the second side portion 30f of the second rotor arm 30c and the second cover member 33 and has a fifth guard portion 34c integrally formed with the first guard portion 34a. The second guard member 35 covers at least one portion of the boundary between the other second side portion 30g of the second rotor arm 30c and the second cover member 33 and has a sixth guard portion 35c integrally formed with the second guard portion 35a. The second side portion 30f of the second rotor arm 30c is disposed downstream of the other second side portion 30g with respect to the fishing line winding direction A.

In this case, the boundary between the second side portion 30f of the second rotor arm 30c and the second cover member 33 is covered with the first guard member 34, and the boundary between the other second side portion 30g of the second rotor arm 30c and the second cover member 33 is covered with the second guard member 35. Therefore, it is possible to protect the boundary between the pair of second side portions 30f and 30g of the second rotor arm 30c and the second cover member 33 in addition to protecting the boundary between the rear end surface and the outside surface of the coupling portion 30a and the boundary between the pair of first side portions 30d and 30e of the first rotor arm 30b and the first cover member 32.

(I) In the spinning reel 100, the second cover member 33 is fixed at least to the second rotor arm 30c with the screw member 55b. The first guard member 34 is fixed to the rotor body 30 at the connecting section of the first guard portion 34a and the fifth guard portion 34c, and the second guard member 35 is fixed to the rotor body at the connecting section of the second guard portion 35a and the sixth guard portion 35c, respectively, by the screw member 56b.

In this case, the second cover member 33 is fixed to the rotor with the screw member 55b, and the first guard member 34 and the second guard member 35 are fixed to the rotor body 30 with the respective screw member 56a and screw member 56b. Therefore, the first guard member 34 and the second guard member 35 can be detached from the rotor body 30 via the screw members 56a and 56b, respectively.

(J) In the spinning reel 100, the fifth guard portion 34c is disposed between the second cover member 33 and the second rotor arm 30c and has a third holding portion 34i fixed to the second rotor arm 30c by the second cover member 33. The sixth guard portion 35c is disposed between the second cover member 33 and the second rotor arm 30c and has a fourth holding portion 35i fixed to the second rotor arm 30c by the second cover member 33.

In this case, when the second cover member 33 is fixed to the second rotor arm 30c, the third holding portion 34i and the fourth holding portion 35i are fixed to the second rotor arm 30c. Therefore, even if the respective connecting section of the first guard member and the second guard member are fixed with the respective screw member 56a and screw member 56b, wobbling is not likely to occur in the fifth guard portion 34c and the sixth guard portion 35c.

(K) In the spinning reel 100, the third holding portion 34i has a third engaging portion 34j that prevents displacement of the fifth guard portion 34c by engaging the inner surface of the second cover member 33. The third holding portion 34i also has a second positioning protrusion 34k that is provided separate from the third engaging portion 34j, with the second positioning protrusion 34k positioning the fifth guard portion 34c. The fourth holding portion 35i has a fourth engaging portion 35j that prevents displacement of the sixth guard portion 35c by engaging the inner surface of the second cover member 33. The fourth holding portion 35i also has a fourth positioning protrusion 35k that is provided separate from the fourth engaging portion 35j, the fourth positioning protrusion 35k positioning the sixth guard portion 35c.

In this case, even if the first guard member 34 and the second guard member 35 are respectively fixed to the rotor body 30 by the screw member 56a and the screw member 56b at the respective connecting sections, displacement of the fifth guard portion 34c of the first guard member 34 and the sixth guard portion 35c of the second guard member 35 can be prevented by the third engaging portion 34j and the fourth engaging portion 35j, respectively; moreover, the positioning thereof is carried out by the third positioning protrusion 34k and the fourth positioning protrusion 35k. Therefore, even if a fifth guard portion 34c is provided to the first guard member 34 and a sixth guard portion 35c to the second guard member 35, displacement of the fifth guard portion 34c and the sixth guard portion 35c is not likely to occur.

(L) In the spinning reel 100, the first guard portion 34a and the fifth guard portion 34c of the first guard member 34 and the second guard portion 35a and the sixth guard portion 35c of the second guard member 35 are connected smoothly.

In this case, the fifth guard portion 34c disposed along the longitudinal direction and the first guard portion 34a disposed along the circumferential direction, as well as the sixth guard portion 35c disposed along the longitudinal direction and the second guard portion 35a disposed along the circumferential direction, are connected smoothly. Therefore, the fishing line is not likely to get caught at the connecting section(s).

(M) In the spinning reel 100, the first guard member 34 and the second guard member 35 are made from a synthetic resin, and the synthetic resin material is exposed to the outside surface. In this case, due to the first guard member 34 and the second guard member 35 being made from a synthetic resin, reduction in the weight can be achieved even if a guard member that is softer and more easily scratched than that made from metal is installed. Also, the synthetic resin material is exposed to the outside surface, namely, a coat is not formed according to plating, coating, or the like. Therefore, the coat does not peel off, and only the material itself is scratched. As a result, even if the first guard member 34 and the second guard member 35 are scratched, the scratch will not be too conspicuous.

Other Embodiments

One embodiment of the present invention was described above. However, the present invention is not limited to the embodiment described above, and various changes are possible without deviating from the essence of the invention. In particular, the many embodiments and modifications described in the specification can be optionally combined as needed.

Figure 7:
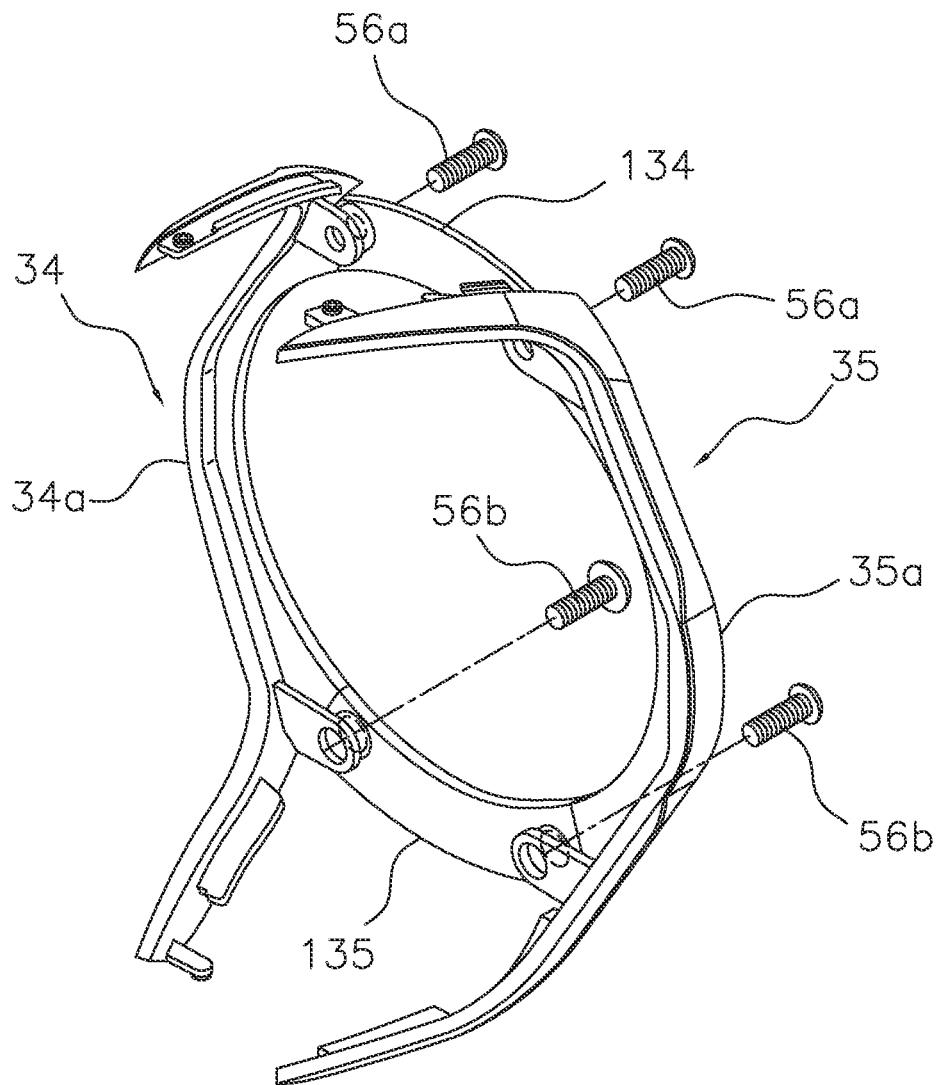
FIG. 7 is an exploded perspective view of another embodiment of the guard member.

(a) In the embodiment described above, a rear cover member is not disposed at the rear surfaces of the first guard member 34 and the second guard member 35. However, the present invention is not limited to this mode. For example, it is possible to provide a first rear cover member 134 and a second rear cover member 135 that respectively connect the two end portions of the first guard portion 34a of the first guard member 34 and the two end portions of the second guard portion 35a of the second guard member 35, as illustrated in FIG. 7. In this case, detachment of the cover members is made easy by providing the first rear cover member 134 and the second rear cover member 135 separate from the first guard member 34 and the second guard member 35, as illustrated in FIG. 7. In FIG. 7, the first rear cover member 134 is fixed to the rotor body 30 together with the first guard member 34 and the second guard member 35 by the screw member 56a. The second rear cover member 135 is fixed to the rotor body 30 together with the first guard member 34 and the second guard member 35 by the screw member 56b.

Also, it is possible to integrally form the first rear cover member 134 to either the first guard member 34 or the second guard member 35 and to integrally form the second rear cover member 135 to the other first guard member 34 or the second guard member 35.

(b) In the embodiment described above, the first and second cover members 32 and 33 were provided to both the first and second rotor arms 30b and 30c. However, the cover member can be provided to only one of the rotor arms. In this case, it is possible in a rotor arm that does not have a cover member, for example, to provide a mounting concave portion to the pair of side parts of the rotor arm. It is also possible to not provide the fifth guard portion and the sixth guard portion.

(c) In the embodiment described above, a third guard portion 34b and a fifth guard portion 34c were provided to the first guard member 34, and a fourth guard portion 35b and a sixth guard portion 35c were provided to the second guard member 35. However, these portions need not be provided. Also, the third, fourth, fifth, and sixth guard members can respectively be provided to be independent from the first guard member and the second guard member. It is also possible to integrally form the third guard portion and the fourth guard portion, as well as the fifth guard portion and the sixth guard portion.

(d) In the other embodiment (a), the first rear cover member and the second rear cover member were provided as separate members. However, these members can be integrally formed with an annular shape. In this case, the screw that is fastening the rear cover member and the guard member with the rotor left attached to the reel body is removed, the rear cover member is slid towards the rear, and the guard member is removed.

What is claimed is:

1. A spinning reel for delivering fishing line in a forward direction, the spinning reel comprising:
    a spinning reel body;
    a handle rotatably supported by the reel body;
    a rotor supported by the reel body to rotate around a longitudinal axis that is offset from an axis of rotation of the handle; and
    a spool supported by the reel body to move in a longitudinal direction of the longitudinal axis, the spool being arranged to have the fishing line wound thereon by the rotor,
    the rotor including
       a rotor body having a cylindrical coupling portion that is rotatably supported by the reel body, a first rotor arm extending forward from a rear end portion of the coupling portion, the first rotor arm being spaced apart from the coupling portion and having a pair of first side portions, and a second rotor arm extending forward from the rear end portion of the coupling portion, the second rotor arm being spaced apart from the coupling portion and having a pair of second side portions, the first and second rotor arms being located on diametrically opposite sides of the coupling portion,
       a first cover member removably attached to the rotor body and covering a radially outer side of the first rotor arm,
       a first guard member removably attached to an exterior of the rotor body, the first guard member having a first guard portion that covers at least a portion of a boundary between an outside surface of the coupling portion and a rear end surface of the rear end portion of the coupling portion,
       a second guard member removably attached to the exterior of the rotor body, the second guard member having a second guard portion that covers at least a portion of the boundary between the outside surface and the rear end surface of the coupling portion at a position that opposes the first guard portion, and
       a fishing line guide portion pivotally coupled to extreme ends of the first rotor arm and the second rotor arm, the fishing line guide portion being arranged to wind the fishing line onto the spool.

2. The spinning reel according to claim 1, wherein
    the first guard portion and the second guard portion are disposed in the coupling portion between the first rotor arm and the second rotor arm.

3. The spinning reel according to claim 1, wherein
the first guard member and the second guard member are made from a synthetic resin material, the synthetic resin material being exposed on an outside surface of each of the first and second guard members,
a crank arm including only the single sprocket attached to the crank arm.

4. A spinning reel for delivering fishing line in a forward direction, the spinning reel comprising:
a spinning reel body;
a handle rotatably supported by the reel body;
a rotor supported by the reel body to rotate around a longitudinal axis that is offset from an axis of rotation of the handle; and
a spool supported by the reel body to move in a longitudinal direction of the longitudinal axis, the spool being arranged to have the fishing line wound thereon by the rotor,
the rotor including
a rotor body having a cylindrical coupling portion that is rotatably supported by the reel body, a first rotor arm extending forward from a rear end portion of the coupling portion, the first rotor arm being spaced apart from the coupling portion and having a pair of first side portions, and a second rotor arm extending forward from the rear end portion of the coupling portion, the second rotor arm being spaced apart from the coupling portion and having a pair of second side portions, the first and second rotor arms being located on diametrically opposite sides of the coupling portion,
a first cover member removably attached to the rotor body and covering a radially outer side of the first rotor arm,
a first guard member removably attached to the rotor body, the first guard member having a first guard portion that covers at least a portion of a boundary between an outside surface of the coupling portion and a rear end surface of the rear end portion of the coupling portion,
a second guard member removably attached to the rotor body, the second guard member having a second guard portion that covers at least a portion of the boundary between the outside surface and the rear end surface of the coupling portion at a position that opposes the first guard portion, and
a fishing line guide portion pivotally coupled to extreme ends of the first rotor arm and the second rotor arm, the fishing line guide portion being arranged to wind the fishing line onto the spool,
the first guard portion and the second guard portion are disposed in the coupling portion between the first rotor arm and the second rotor arm,
the first guard member having a third guard portion that covers at least a portion of a boundary between the first cover member and one of the first side portions of the first rotor arm, and
the second guard member having a fourth guard portion that covers at least a portion of a boundary between the first cover member and the other first side portion of the first rotor arm.

5. The spinning reel according to claim 4, wherein
the first cover member is fixed at least to the first rotor arm by a first screw member,
the first guard member is fixed to the rotor body by a second screw member at a connecting section that is located between the first guard portion and the third guard portion, and
the second guard member is fixed to the rotor body by a third screw member at a connecting section that is located between the second guard portion and the fourth guard portion.

6. The spinning reel according to claim 5, wherein
the third guard portion has a first holding portion disposed between the first cover member and the first rotor arm, the first holding portion being fixed to the first rotor arm by the first cover member, and
the fourth guard portion has a second holding portion disposed between the first cover member and the first rotor arm, the second holding portion being fixed to the first rotor arm by the first cover member.

7. The spinning reel according to the claim 6, wherein
the first holding portion has a first engaging portion engaging an inner surface of the first cover member and preventing displacement of the third guard portion,
the first holding portion further has a first positioning protrusion provided separate from the first engaging portion to position the third guard portion,
the second holding portion has a second engaging portion engaging the inner surface of the first cover member and preventing displacement of the fourth guard portion, and
the second holding portion further has a second positioning protrusion provided separate from the second engaging portion to position the fourth guard portion.

8. The spinning reel according to claim 4, wherein
the third guard portion has a first holding portion disposed between the first cover member and the first rotor arm, the first holding portion being fixed to the first rotor arm by the first cover member, and
the fourth guard portion has a second holding portion disposed between the first cover member and the first rotor arm, the second holding portion being fixed to the first rotor arm by the first cover member.

9. The spinning reel according to the claim 8, wherein
the first holding portion has a first engaging portion engaging an inner surface of the first cover member and preventing displacement of the third guard portion,
the first holding portion further has a first positioning protrusion provided separate from the first engaging portion to position the third guard portion,
the second holding portion has a second engaging portion engaging the inner surface of the first cover member and preventing displacement of the fourth guard portion, and
the second holding portion further has a second positioning protrusion provided separate from the second engaging portion to position the fourth guard portion.

10. The spinning reel according to claim 4, wherein
the first guard portion and the third guard portion of the first guard member have exterior surfaces that are smoothly connected to each other, and the second guard portion and the fourth guard portion of the second guard member have exterior surfaces that are smoothly connected to each other.

11. The spinning reel according to claim 4, wherein
the rotor has a second cover member that covers a radially outer side of the second rotor arm,
one of the first side portions of the first rotor arm is disposed upstream of the other of the first side portions with respect to a fishing line winding direction of the rotor, the first guard member covers at least a portion of a boundary between one of the second side portions of the second rotor arm and the second cover member, the first guard member has a fifth guard portion integrally formed with the first guard portion as a one-piece member, the second guard member covers at least a portion of a boundary between the other of the second side portions of the second rotor arm and the second cover member, the second guard member has a sixth guard portion integrally formed with the second guard portion as a one-piece member, and one of the second side portions is disposed downstream of the other of the second side portions with respect to the fishing line winding direction of the rotor.

12. The spinning reel according to claim 11, wherein
the first guard portion and the fifth guard portion of the first guard member have exterior surfaces that are smoothly connected to each other, and the second guard portion and the sixth guard portion of the second guard member have exterior surfaces that are smoothly connected to each other.

13. The spinning reel according to claim 11, wherein
the second cover member is fixed to the second rotor arm by at least a single fourth screw member,
the first guard member is fixed to the rotor body by a fifth screw member at a connecting section that is located between the first guard portion and the fifth guard portion, and
the second guard member is fixed to the rotor body by a sixth screw member at a connecting section that is located between the second guard portion and the sixth guard portion.

14. The spinning reel according to claim 13, wherein
the fifth guard portion has a third holding portion disposed between the second cover member and the second rotor arm, the third holding portion being fixed by the second cover member, and
the sixth guard portion has a fourth holding portion disposed between the second cover member and the second rotor arm, the fourth holding portion being fixed by the second cover member.

15. The spinning reel according to claim 14, wherein
the third holding portion has a third engaging portion engaging an inner surface of the second cover member and preventing displacement of the fifth guard portion,
the third holding portion further has a third positioning protrusion provided separate from the third engaging portion to position the fifth guard portion,
the fourth holding portion has a fourth engaging portion engaging the inner surface of the second cover member and preventing displacement of the sixth guard portion, and
the fourth holding portion further has a fourth positioning protrusion provided separate from the fourth engaging portion to position the sixth guard portion.

* * * * *